United States Patent [19]

Azuma et al.

[11] Patent Number: 5,307,171
[45] Date of Patent: Apr. 26, 1994

[54] VIDEO TAPE RECORDER/PLAYER

[75] Inventors: Nobuo Azuma, Yokohama; Yoshizumi Watatani, Fujisawa; Atsushi Yoshioka, Ebina; Shuichi Matsuo, Tokyo; Tadasu Otsubo, Chigasaki, all of Japan

[73] Assignee: Hitachi, Ltd., Tokyo, Japan

[21] Appl. No.: 556,578

[22] Filed: Jul. 24, 1990

[30] Foreign Application Priority Data

Jul. 24, 1989 [JP] Japan .................................. 1-188953
Sep. 8, 1989 [JP] Japan .................................. 1-231627

[51] Int. Cl.$^5$ ......................... H04N 5/78; H04N 5/783
[52] U.S. Cl. ..................................... 358/335; 360/33.1
[58] Field of Search ............... 358/310, 335, 330, 181, 358/140, 141, 11, 12; 360/35.8, 33.1; H04N 5/78, 5/76, 5/783, 9/79

[56] References Cited

U.S. PATENT DOCUMENTS

| | | | |
|---|---|---|---|
| 4,317,603 | 8/1980 | Hjortzberg | 358/310 |
| 4,549,224 | 10/1985 | Nakamura et al. | 358/310 |
| 4,551,754 | 11/1985 | Meise et al. | 358/12 |
| 4,686,582 | 8/1987 | Lovely | 358/310 |
| 4,730,222 | 3/1988 | Schouffele | 358/335 |
| 4,743,977 | 5/1988 | Yoshioka et al. | 360/18 |
| 4,825,301 | 4/1989 | Pape et al. | 358/335 |
| 4,853,766 | 8/1989 | Isnardi et al. | 358/12 |
| 4,963,991 | 10/1990 | Honjo | 358/310 |
| 5,040,068 | 8/1991 | Parulski et al. | 358/335 |
| 5,150,218 | 9/1992 | Ezaki | 358/310 |

Primary Examiner—Tommy P. Chin
Assistant Examiner—Thai Tran
Attorney, Agent, or Firm—Antonelli, Terry, Stout & Kraus

[57] ABSTRACT

A video tape recorder/player capable of selectively recording a wide-band video signal including information for forming a picture of an aspect ratio $a_1$, and a normal video signal for forming a picture of an aspect ratio $a_2$. The video tape recorder/player comprises video signal discriminating means for discriminating between the reproduced wide video signal and the reproduced normal video signal reproduced from a magnetic recording medium, and time expansion means for expanding the time base of the reproduced video signal by a factor approximately equal to the ratio $a_1/a_2$. Either the reproduced video signal or the output signal of the time expansion means obtained by expanding the time base of the reproduced signal by the time expansion means can be selected as an output signal when the video signal discriminating means detects the wide video signal.

16 Claims, 10 Drawing Sheets

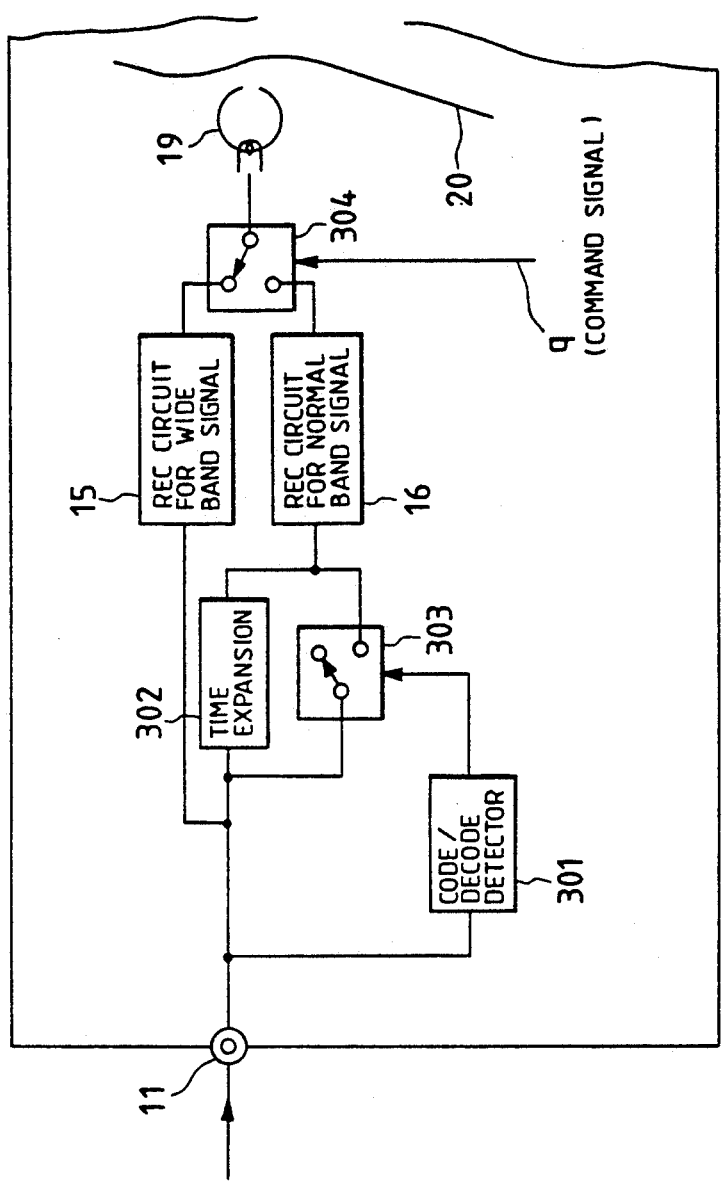
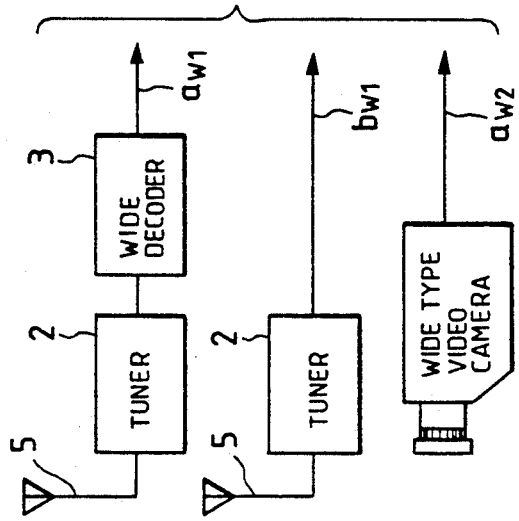
FIG. 5

FIG. 8
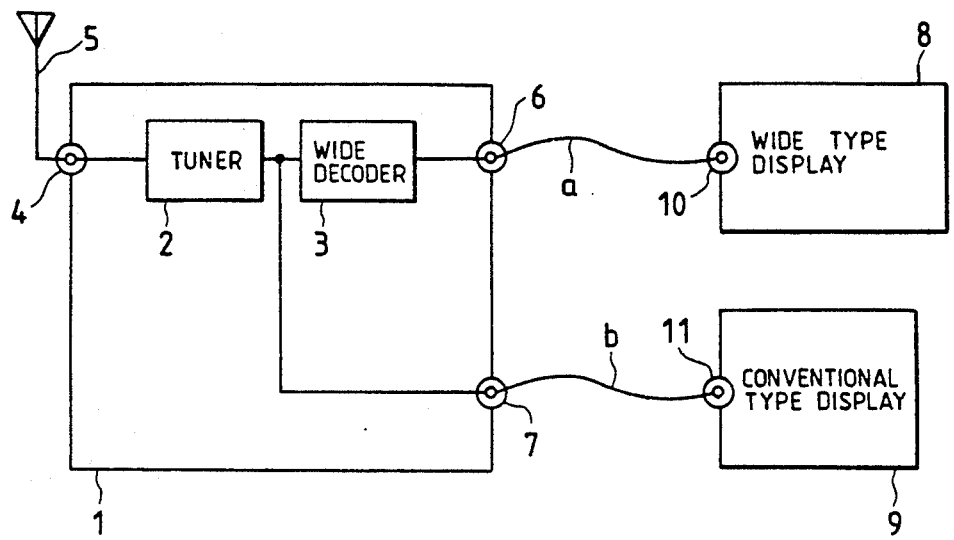
FIG. 9(A)
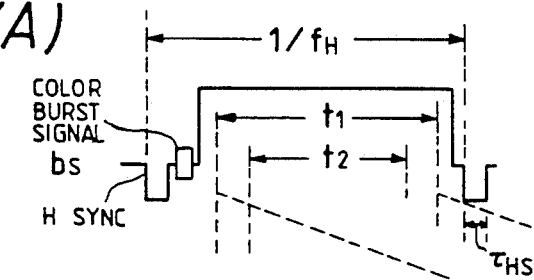
FIG. 9(B)
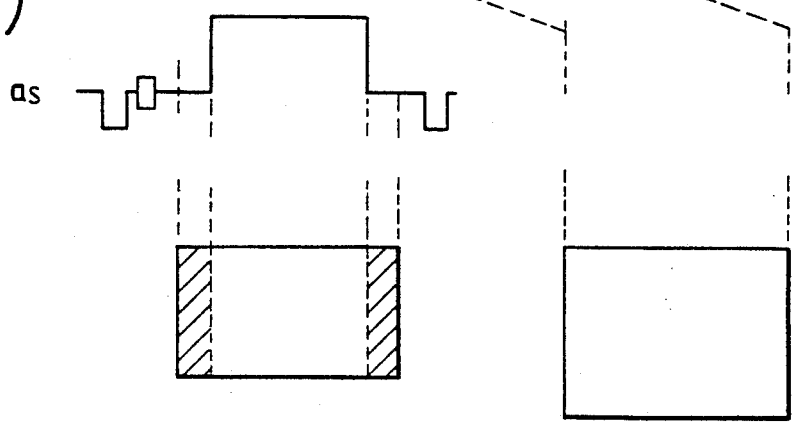
FIG. 9(C)    FIG. 9(D)

FIG. 11
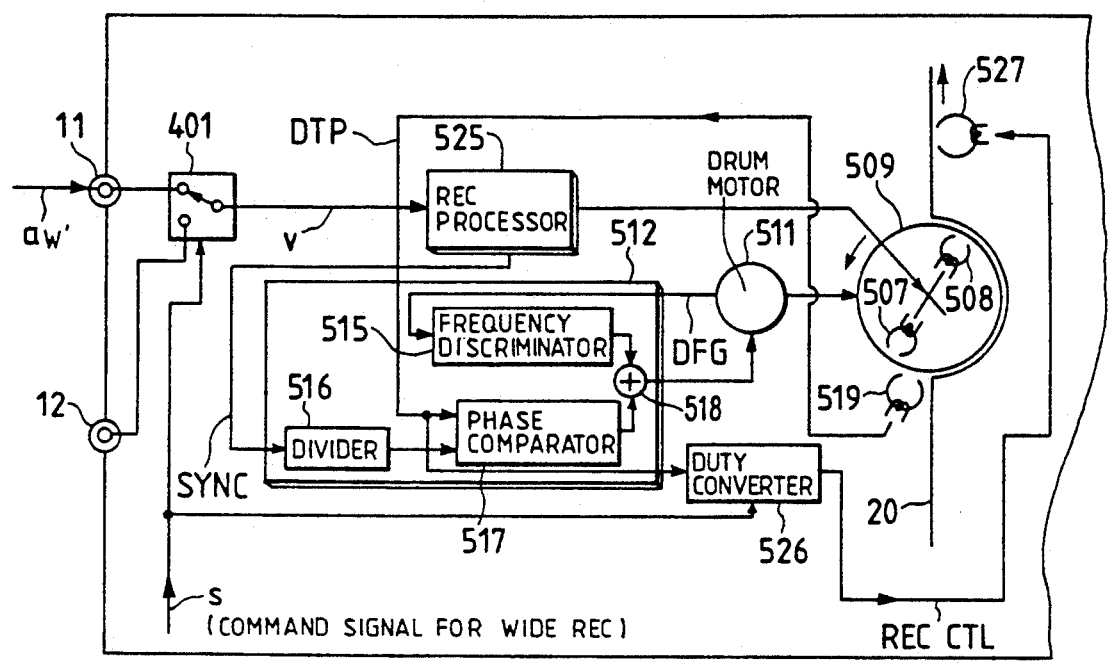
FIG. 12(A) REC CTL($a_2$)
FIG. 12(B) REC CTL($a_1$)

VIDEO TAPE RECORDER/PLAYER

BACKGROUND OF THE INVENTION

The present invention relates to a video tape recorder/player capable of recording and reproducing two kinds of video signals of different aspect ratios.

Efforts have been made to develop wide-picture TV systems of increased aspect ratios among EDTV (extended definition TV) broadcasting systems which have been developed to improve the picture quality and presence of the current NTSC color TV system. In developing the wide-picture TV system, consideration is given to the compatibility of TV sets of the current NTSC color TV system A wide-picture TV system disclosed in The Institute of Television Engineers of Japan Gijutsu Hokoku, vol. 12, No. 30, pp. 43–48 (Aug. 25, 1988) forms wide video signals (multiplex video signals) of an aspect ratio $a_1$, for example, 16:9, (the aspect ratio $a_2$ of the screen of the current NTSC color TV system is 4:3) by multiplexing image information in the right and left end portions (side panels). It is also possible to transmit video signals of an aspect ratio $a_1$ obtained by cutting the upper and lower portions of a screen of an aspect ratio $a_2$ (auxiliary signals are multiplexed in the upper and lower blank portions to improve the resolution).

The current TV sets are able to receive wide video signals obtained by multiplexing the side panels for forming a screen of an aspect ratio $a_1$ and the auxiliary signals, and hence the wide video signals may be recorded by the conventional video tape recorder/player, i.e., a domestic VTR having a rotary head helical scanning system.

The conventional VTR is not constructed for recording and reproducing the wide video signals, for the identification of aspect ratio and for discrimination between the video signals of the current NTSC system and the multiplex video signals. Therefore, when the multiplex video signals are recorded and reproduced by the conventional VTR, the resolution is unsatisfactory because of the narrow recording band of the VTR or the reproduced picture is expanded heightwise or widthwise.

SUMMARY OF THE INVENTION

Accordingly, it is an object of the present invention to provide a video tape recorder/player capable of readily recording an reproducing video signals of two different systems in a satisfactory quality.

In one aspect of the present invention, a video tape recorder/player comprises: first video signal discriminating means for determining if an input signal to be recorded is a wide video signal of an aspect ratio $a_1$ including side panel information (the output signal of a wide-decoder) or a normal video signal of an aspect ratio $a_2$; recording means for recording an input wide video signal in the ordinary (normal) recording mode, expanding the time base or in a wide-band video signal recording mode for a band not less than $a_1/a_2$ times the band for the ordinary recording mode, without expanding the time base; second video signal discriminating means for determining if a signal reproduced from a magnetic recording medium (magnetic tape) is a wide video signal or a normal video signal; and time expanding means for expanding the time base of the reproduced signal by approximately $a_1/a_2$ times. The video tape recorder/player provides the reproduced signal without expanding the time base when the reproduced signal is a wide video signal to be displayed on a wide display of an aspect ratio $a_1$, and provides the reproduced signal after expanding the time base when the reproduced signal is to be displayed on an ordinary display of an aspect ratio $a_2$.

The picture information of the output wide video signal of the wide-decoder is increased at a compression ratio approximately equal to $a_1/a_2$ as compared with that of the normal video signal. However, the wide video signal can be recorded without degrading the resolution in a magnetic tape for wide video signals. Since the input signal to be recorded is discriminated, wide video signals are never recorded erroneously in the normal-band recording mode. When a normal magnetic tape is used for recording wide video signals, the time base is expanded and the wide video signals are recorded in the ordinary recording mode.

In reproducing a recorded wide video signal from a magnetic tape, the wide video signal is reproduced without expanding the time base to display a corresponding picture of an aspect ratio $a_1$ on a wide display of an aspect ratio $a_1$. When the same wide video signal is to be displayed on a normal display of an aspect ratio $a_2$, the wide video signal is provided after expanding the time base to cut picture information in the side panels and to display only the central portion of the picture, so that the picture is expanded neither widthwise nor heightwise.

BRIEF DESCRIPTION OF THE DRAWINGS

FIGS. 3, 4, 5 and 6 are block diagrams of video tape recorder/players in second, third, fourth and fifth embodiments according to the present invention, respectively;

FIG. 8 is a block diagram of a wide-picture TV system;

FIGS. 9(A) to 9(D) and 10(A) to 10(D) are waveform charts of assistance in explaining the operation of the wide-picture TV system of FIG. 8 and the video tape recorder/player of FIG. 1;

FIGS. 11, 13, 15 and 16 are block diagrams of video tape recorder/players in sixth, seventh, eighth and ninth embodiments according to the present invention, respectively;

FIGS. 12(A) and 12(B) are waveform charts showing the waveforms of control signals.

DETAILED DESCRIPTION OF THE PREFERRED EMBODIMENTS

Figure 1:
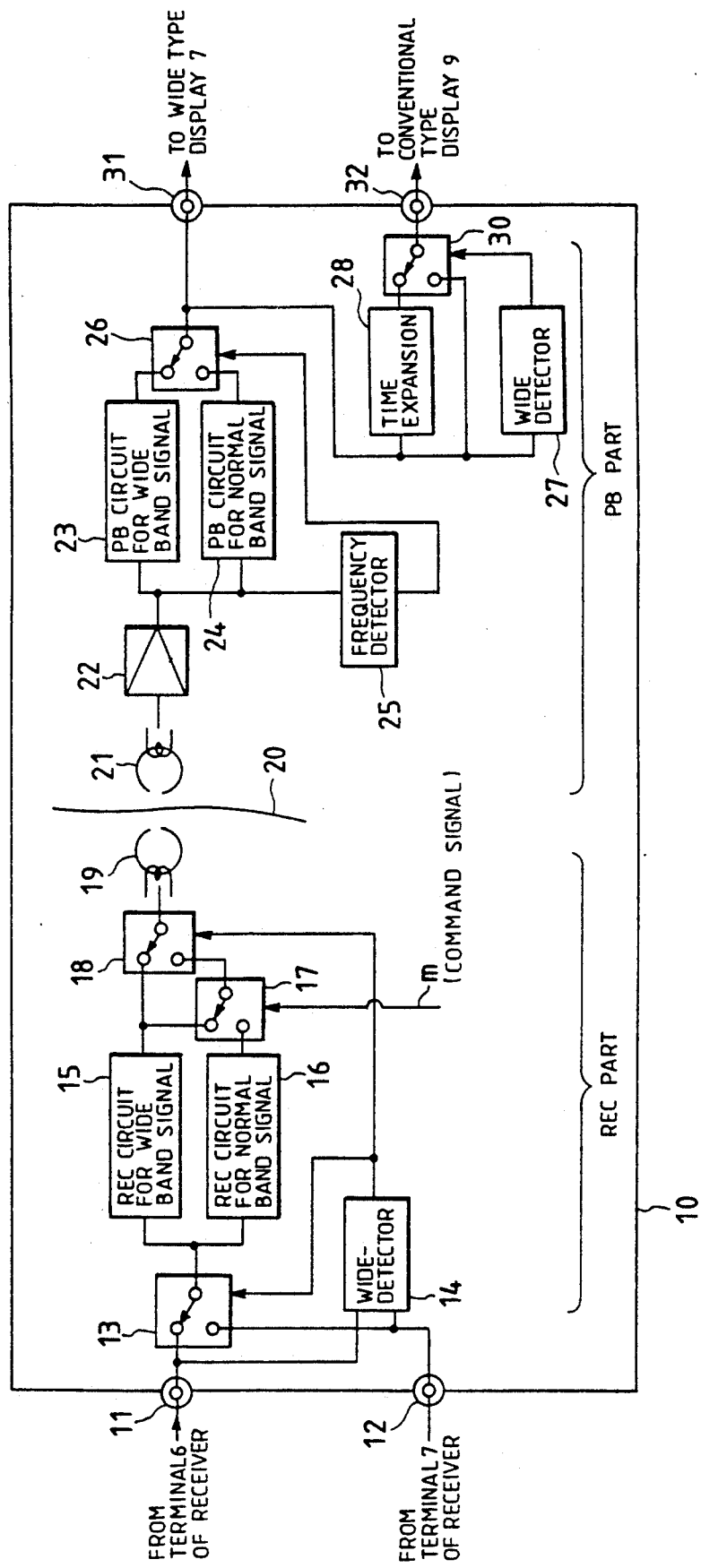
FIG. 1 is a block diagram of a video tape recorder/player in a first embodiment according to the present invention.

Prior to the description of the preferred embodiments of the present invention, a wide-picture TV system will be explained.

Referring to FIG. 8, there are shown a wide receiver 1, a tuner 2, a wide-decoder 3 for a wide video signal including side panel information for forming a picture of an aspect ratio $a_1$, for example 16:9, or a multiplex video signal into a video signal which can be displayed in a wide picture on a wide display, an antenna terminal 4, an antenna 5, a wide output terminal 6 through which an output a is provided, a normal output terminal 7 through which an output signal b is provided, a wide display 8 of an aspect ratio $a_1$ (16:9) a normal display 9 of an aspect ratio $a_2$ (4:3), input terminals 10 and 11 respectively of the wide display 8 and the normal display 9.

FIGS. 9(A) and 9(B) show the waveform of the output signal $b_s$ of the tuner 2 and the waveform of the output signal $a_s$ of the wide-decoder 3, respectively, when a normal video signal is received through the antenna 5. The waveforms are shown for the period $1/f_H$ ($f_H$ is the frequency of the horizontal synchronizing signal) of the horizontal synchronizing signal. The value of $1/f_H$ is 63.56 μs for the NTSC system.

The video signal of the waveform $b_s$ is applied to the input terminal 11 of the normal display 9 to display a normal picture of the aspect ratio $a_2$ as shown in FIG. 9(D). If the output signal $b_s$ is applied to the wide display 8, a picture expanded widthwise is displayed, for example, a circular pattern is displayed in an elliptic picture, hence the output signal of the waveform $a_s$ obtained by compressing the time base for the wide-decoder 3 by a factor $t_2/t_1$ (FIG. 9(A)) is applied to the input terminal 10 to display a picture having a normal shape. In this embodiment, the time base is compressed by the wide-decoder, the compressing process need not necessarily be limited to compression by a wide-picture TV system. As shown in FIG. 9(C), no picture information is assigned to the side panels, and the side panels are replaced by a black or grey signal.

FIGS. 10(A) to 10(D) show the waveforms of the respective output signals $b_W$ and $a_W$ of the tuner 2 and the wide-decoder 3 when a multiplex video signal of the aspect ratio $a_1$ is received through the antenna 5.

Figures 10A, 10B, 10C, 10D:
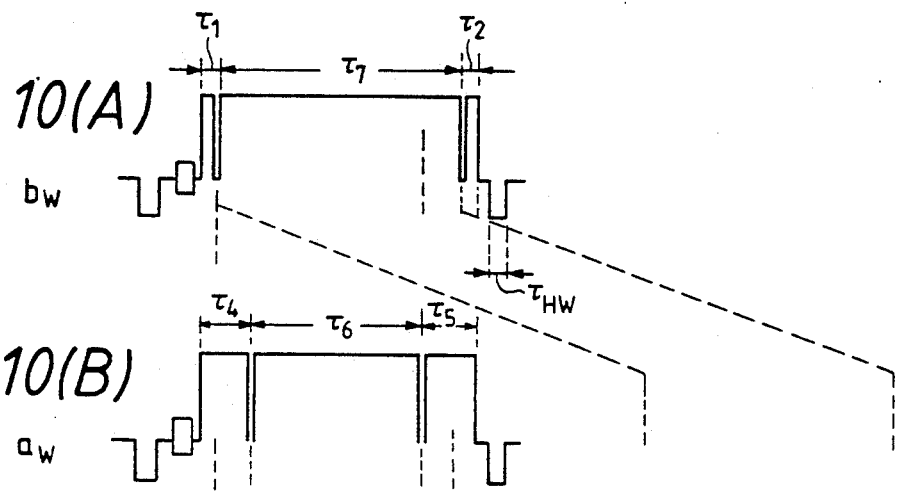

Picture information is a portion of the video signal, including a horizontal synchronizing signal $H_{sync}$ and a color burst signal $f_{sc}$, i.e., a portion including $\tau_1 + \tau_7 + \tau_2$, other than a portion corresponding to the horizontal blanking period (FIG. 10(A)). Since the ratio of the over scanning times $\tau_1$ and $\tau_2$ of the current receiver is approximately 8%, the wide video signal $b_W$ can be obtained by expanding (encoding) the central portion of the time $\tau_6$ of the screen of the wide display (FIG. 10(C)) to the time $\tau_7$ of the signal $b_W$, and by compressing (encoding) the side panel portion of the times $\tau_4$ and $\tau_5$ of the screen of the wide display to the times $\tau_1$ and $\tau_2$ of the signal b. Discrimination between the normal video signal and the wide video signal is achieved through discrimination between the pulse width $\tau_{HS}$ of the horizontal synchronizing signal of the normal video signal and the pulse width $\tau_{HW}$, which is smaller than $\tau_{HS}$, of the synchronizing signal of the wide video signal.

When the signal $b_W$ is received, the time $\tau_7$ of the central portion of the output signal $b_W$ of the tuner 2 (FIG. 8) is compressed to time $\tau_6$ by the wide-decoder 3 (approximately $a_1/a_2$ times), and the respective times $\tau_1$ and $\tau_2$ of the side panels are expanded respectively to times $\tau_4$ and $\tau_5$ to provide the signal $a_W$. The signal $a_W$ is applied to the wide display 8 to display a wide picture as shown in FIG. 10(C). In this embodiment, $\tau_1 = \tau_2$ and $\tau_4 = \tau_5$. The central portion of the time $\tau_7$ of the signal $b_W$ is displayed normally on the normal display 9 as shown in FIG. 10(D). The portions of the times $\tau_1$ and $\tau_2$ are not displayed because they are overscanning portions.

A video tape recorder/player in a first embodiment according to the present invention will be described hereinafter with reference to FIGS. 1 and 10(A) to 10(D).

First Embodiment

Referring to FIG. 1, the video tape recorder/player 10 capable of recording and reproducing two types of video signals of different aspect ratios comprises a wide video signal input terminal 11, a normal signal input terminal 12, switches 13, 17, 18, 26 and 30 controlled by control signals, a wide-detector 14 which determines if an input signal to be recorded is a wide video signal or a normal video signal, a wide-band signal recording circuit 15 for recording a signal in a wide-band mode, a normal-band signal recording circuit 16 for recording a signal in a normal-band mode, a magnetic recording head 19, a magnetic tape 20, a magnetic reproducing head 21 (the magnetic reproducing head 21 may be substituted by the magnetic recording head 19), a preamplifier 22, a wide-band signal PB circuit 23 which processes the output FM signal of the preamplifier 22 for reproduction, such as demodulation, a normal-band signal PB circuit 24, a frequency detector 25 for determining if the magnetic tape 20 is recorded in the wide-band mode through the detection of the frequency of the luminance FM signal, a wide-detector 27 for determining if the reproduced signal is a wide-band video signal, and a time expansion circuit for expanding the time $\tau_6$ of the reproduced wide-band video signal having a waveform similar to that of the signal $a_W$ to the time $\tau_7$. For example, the recording and reproducing system of a VHS VTR is employed as the normal-band signal recording circuit 16 and the normal-band signal PB circuit 24, and the recording and reproducing system of a S-VHS VTR is employed as the wide-band signal recording circuit 15 and the wide-band signal PB circuit 23.

The operation of the video tape recorder/player 10 with different input signals to be recorded will be described hereinafter.

(1) Wide Video Signal

Signals $a_W$ (FIG. 10(A)) and $b_W$ (FIG. 10(B)) are applied respectively to the wide signal input terminal 11 and the normal video signal input terminal 12. The signals $a_W$ a $b_W$ are applied also to the wide-detector 14. When the output signal of the wide-detector 14 is HIGH (the output signal is HIGH when at least either the signal applied to the input terminal 11 or that applied to the input terminal 12 is a wide signal), the upper contact of the first switch 13 is closed. A mode command m provided by a system control unit, not shown, goes HIGH (HIGH for the wide-band signal recording mode and LOW for normal-band signal recording mode) to close the respective upper contacts of the second switch 17 and the third switch 18 to apply the wide video signal $a_W$ through the wide-band recording circuit to the magnetic recording head 19.

Figure 2A:
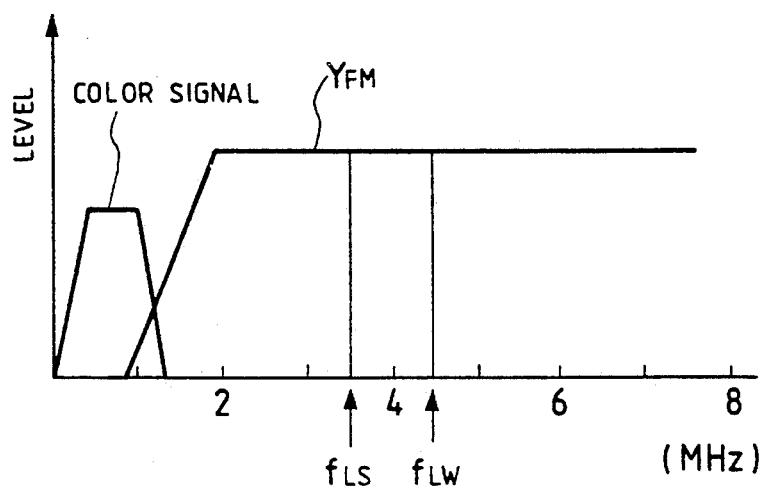
FIGS. 2(A) and 2(B) are spectra of signals recorded in the normal-band recording mode and the wide-band recording mode.
Figure 2B:
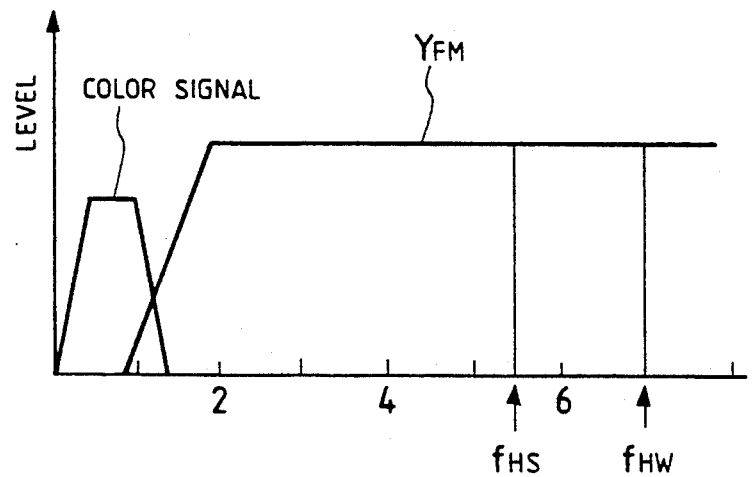

FIGS. 2(A) and 2B) are spectra of signals recorded in the normal-band recording mode and the wide-band recording mode.

Referring to FIGS. 2(A) and 2(B), the time $\tau_7$ of the wide video signal $b_W$ (FIG. 10(A)) is compressed by a factor approximately equal to $a_2/a_1$ (¾) to the time $\tau_6$ of the wide video signal $a_W$ (FIG. 10(B)), so the signal bandwidth of the wide video signal $a_W$ corresponding to the time $\tau_6$ is expanded by the factor $a_1/a_2$. Accordingly, the bandwidth of the conventional VTR must be increased by a factor approximately equal to $a_1/a_2$ or above to record the wide video signal $a_W$ in the original resolution. Therefore, the wide-band signal recording circuit 15 may be set for a bandwidth $a_1/a_2$ times as much as the normal-band signal recording circuit or greater. A recording circuit of an S-VHS system or a ED-$\beta$ system of a current VTR also may be used when a wide-band video tape is used.

In the normal VHS mode, the resolution is on the order of 250 for a sink chip frequency $f_{LS}$ (3.4 MHz) during frequency modulation and a white peak frequency $f_{LW}$ (4.4 MHz) as shown in FIG. 2(A). In the S-VHS mode, the resolution is on the order of 400 and the deviation is 1.6 times for a sink chip frequency $f_{HS}$ and a white peak frequency $f_{HW}$ (7.0 MHz) as shown in FIG. 2(B), which is approximately $a_1/a_2$ times as much as the normal VHS mode and the wide-band signal can satisfactorily be recorded.

The frequency detector 25 detects the frequency of the output FM signal of the preamplifier 22 for reproduction and the switch 26 is controlled according to the detected frequency of the output FM signal. The output signal of the frequency detector 25 is HIGH in the wide-band mode, in which the upper contact of the switch 26 is closed, and is LOW in the normal-band mode, in which the lower contact of the switch 26 is closed. The frequency detector 25 may be substituted by a circuit for detecting the frequency of a FM signal for identifying the S-VHS mode. Then, the wide-band signal is applied through the upper contact of the switch 26 and the output terminal 31 to the wide-band display. At the same time, the time $\tau_6$ of the wide video signal $a_W$ is expanded by about $a_1/a_2$ times to the time $\tau_7$ of the signal $b_W$ by the time expansion circuit 28, and then the signal $a_W$ is applied through the upper contact of the switch 30 and the output terminal 32 to the normal-band display. The time expansion circuit 28 is of an ordinary configuration including an A/D converter, a FIFO (first-in first-out) line memory and subsequent D/A converter. The ratio of a write clock and a read clock applied to the memory is $a_2/a_1$.

When the reproduced signal is a wide video signal, the output signal of the wide-detector goes HIGH to close the upper contact of the switch 30. The wide video signal is identified by the pulse width of the horizontal synchronizing signal. The wide video signal may be identified by an ordinary comparator by using the number of clock pulses representing the pulse width of the horizontal synchronizing signal.

(2) Normal Video Signal

Signals $a_s$ (FIG. 9(B)) and $b_s$ (9(A)) are applied respectively to the wide video signal input terminal 11 and the normal video signal input terminal 12. Then, the output signal of the wide-detector 14 goes LOW to close the lower contact of the switch 13, so that the signal $b_s$ is selected. When a wide-band tape is used and the recording mode command m is HIGH, the signal is recorded in the magnetic tape in the wide-band recording mode. In some cases, the normal-band recording mode is selected for obsolete VTRs unable to operate in the S-VHS mode.

In reproducing the signal, a determination is made to see if the wide-band mode is selected, and then the wide-detector 27 determines if the reproduced signal is a wide-band signal. Since the reproduced signal is a normal-band signal, the output signal of the wide-detector 27 goes LOW and the lower contact of the switch 30 is closed, so that the reproduced signal is transferred directly to the output terminal 32.

Second Embodiment

A video tape recorder/player in a second embodiment is capable of expanding the time base for a wide video signal by approximately $a_1/a_2$ times and recording the time-expanded wide video signal on an ordinary video tape.

Figure 3:
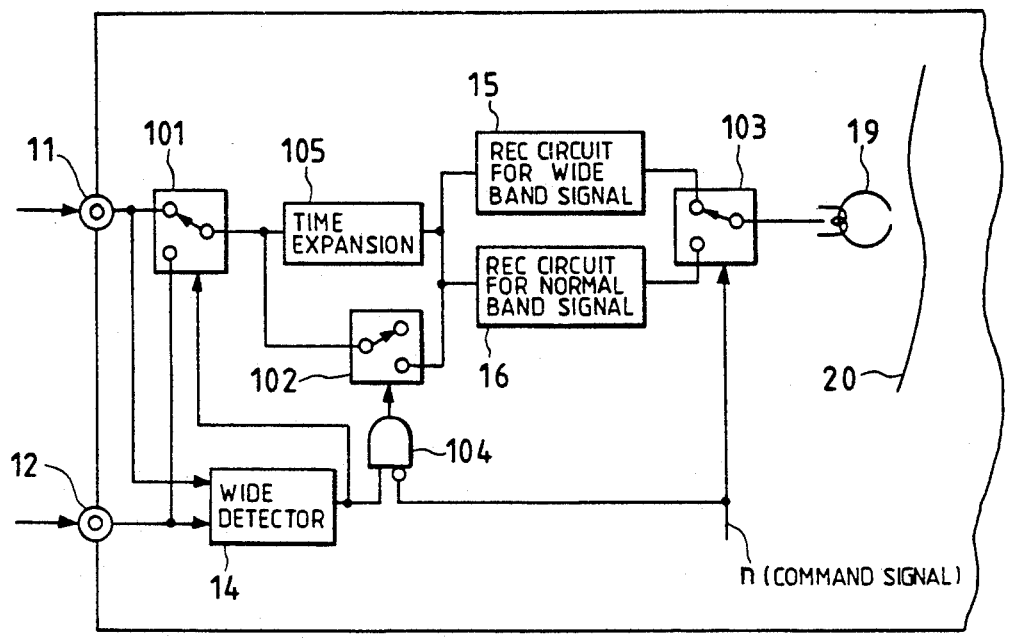

Referring to FIG. 3, in which parts like or corresponding to those previously described with reference to FIG. 1 are denoted by the same reference characters, there are shown changeover switches 101, 102 and 103, a gate 104 and a time expansion circuit 105 for expanding the time base of the input signal by a factor corresponding to about $a_1/a_2$.

When a wide video signal is received, the wide-detector 14 closes the upper contact of the switch 101 to apply the input wide video signal to the time expansion circuit 105. When a wide-band tape is not used, the recording mode command n is LOW, the lower contact of the switch 103 is closed, the output signal of the gate 104 goes HIGH and the upper contact of the switch 102 is closed, the wide video signal (the signal $b_W$ in FIG. 10(A)) is transmitted through the time expansion circuit 105 and the normal-band signal recording circuit 16, and the wide video signal is recorded on the magnetic tape 20. Naturally, the time expansion circuit 105 may be substituted by an encoder for converting the signal $a_W$ (FIG. 10(B)) into the signal $b_W$ (FIG. 10(A)). When a wide video signal or a normal video video signal is recorded on a wide-band tape, the output signal of the gate 104 is LOW and time expansion is not performed. The time expansion circuit may be used for both recording and reproducing. When the input wide video signal is recorded after time expansion, a picture can be reproduced in a normal aspect ratio and the resolution is not degraded even if a wide-band tape is not used.

Third Embodiment

A video tape recorder/player in a third embodiment according to the present invention is not provided with the time expansion circuit 105, and records a video signal before the video signal is applied to the wide-decoder.

Figure 4:
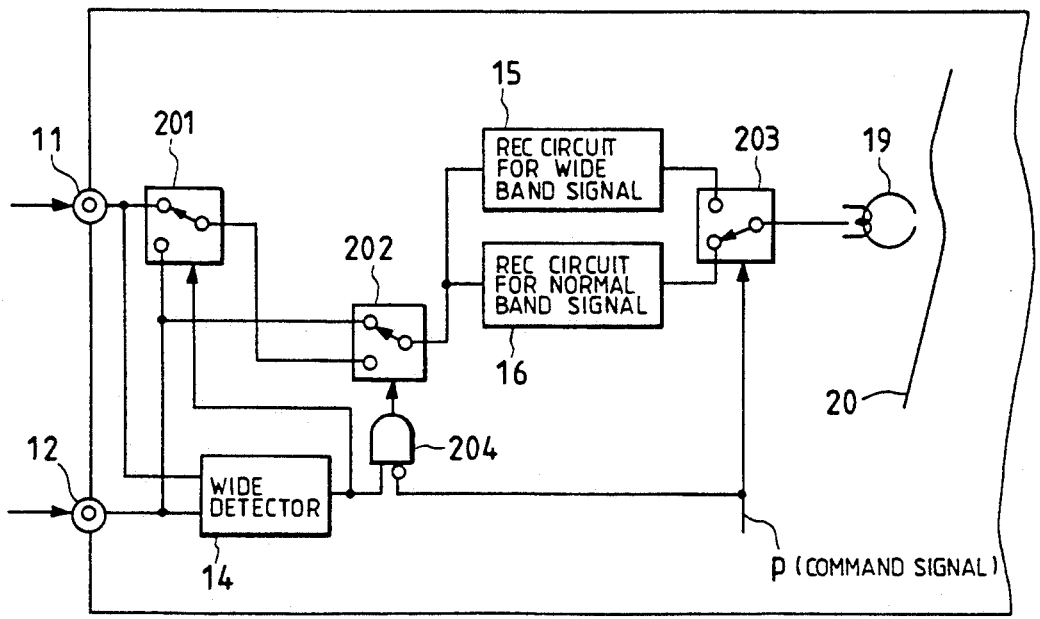

Referring to FIG. 4, there are shown changeover switches 201, 202 and 203, and a gate 104. This video tape recorder/player is suitable for use in combination with a wide video signal receiver as shown in FIG. 8.

When an input wide video signal is recorded on an ordinary tape, the output signal of the wide-detector 14 is HIGH and the upper contact of the switch 201 is closed. Since the recording mode command P is LOW, the output signal of the gate 204 goes HIGH, the upper contact of the switch 202 is closed, and the upper contact of the switch 201 is closed to receive the signal applied to the terminal 11. However, an input wide video signal $b_W$ passed by the normal-band signal recording circuit 16, i.e., the output signal of the tuner 2 (FIG. 8), is received through the terminal 12.

The use of the time expansion circuit 105 is effective when only a decoded signal (the signal $a_W$ of FIG. 10(B)), such as the output signal of a wide TV camera, is applied only to the input terminal 11. When a wide video signal is applied to the input terminal 11 or when a normal video signal is applied to the input terminal 12, the input signal may be selected by means for detecting an active input signal.

Fourth Embodiment

A video tape recorder/player in a fourth embodiment is capable of optimum recording operation when a signal passed by the wide-decoder and a signal before being passed by the wide-decoder are applied to each input terminal.

Referring to FIG. 5, a code/decode detector 301 determines whether a signal applied to the input terminal 11 is a signal before decoding or whether the same is a signal after decoding, for example through the detection of the difference in the frequency components of the signal $b_W$ (the time $\tau_1$ is compressed) on the boundary between the time $\tau_1$ and the time $\tau_7$ of the signal $b_W$ (FIG. 10(A)) or the detection of a discontinuity on the boundary (the signal $a_W$ has no discontinuity). Also shown in FIG. 5 are a time expansion circuit 302 and changeover switches 303 and 304.

In dealing with an input wide video signal, the output signal of the code/decode detector 301 goes HIGH when a decoded signal $a_{W1}$ or the output signal $a_{W2}$ of a wide video camera is applied to the input terminal 11, whereby the upper contact of the switch 303 is closed. Consequently, the time base of the input signal is expanded by the time expansion circuit 303. When a record mode command g is HIGH, the upper contact of the switch 304 is closed to record the input signal by the wide-band signal recording circuit 15 without expanding the time base of the input signal. When the recording mode command q is LOW, namely, when a wide-band tape is not used, the lower contact of the switch 304 is closed to record a wide video signal processed by the time expansion circuit 302, i.e., a signal having the waveform of $b_W$. An input signal $b_{W1}$ before decoding is recorded without time expansion.

In the foregoing description, the output video signals of a tuner and a wide video camera are received through a single line, for example, in a composite video signal. A luminance signal Y and a chrominance signal C (a red signal R, a green signal G, a blue signal B and a synchronizing signal Sync, or a luminance signal Y and chrominance signals R-Y and B-Y) may be received separately.

Although the invention has been described as applied to a wide-picture TV system in which side panel information is compressed in the overscanning portions, the present invention is applicable to other systems by employing appropriate detecting means, for example, to a system utilizing horizontal blanking portions or vertical overscanning portions for side panel information. The idea of the present invention is applicable to a wide-picture TV system of a signal of the aspect ratio $a_1$ with a resolution improving signal in the upper and lower blanks of a picture when a signal decoded by a wide-decoder is recorded in the wide-band mode.

Fifth Embodiment

A video tape recorder/player in a fifth embodiment according to the present invention records a wide video signal identification information (ID information) together with the wide video signal.

Figure 6:
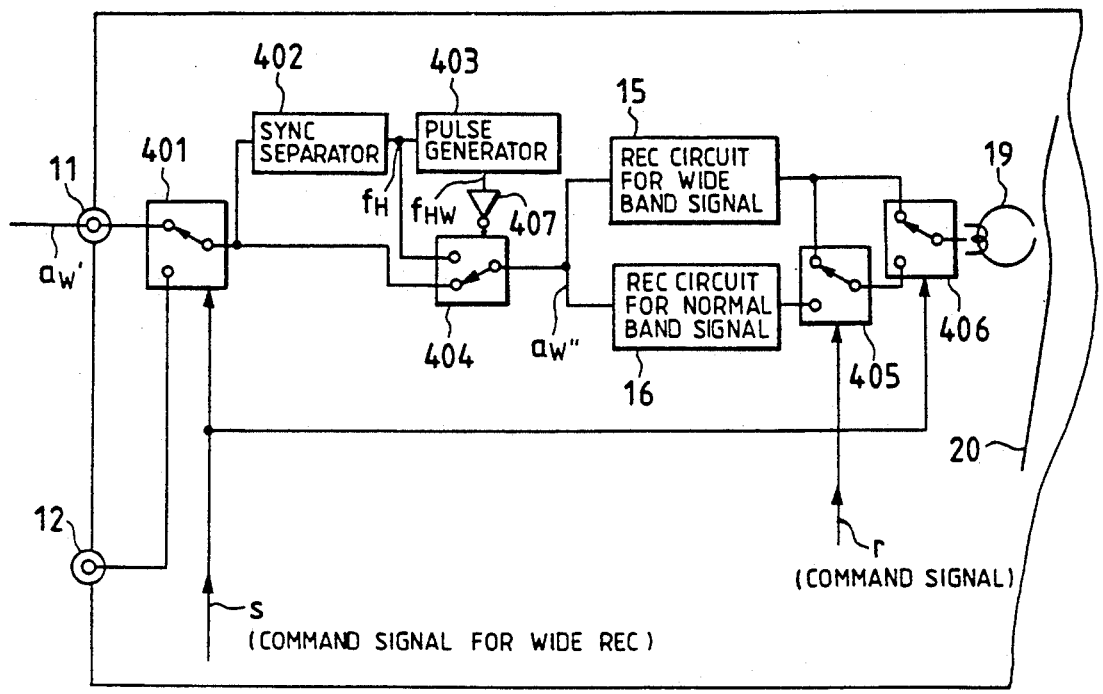

Referring to FIG. 6, there are shown changeover switches 401, 404, 405 and 406, a synchronizing separator 402, a pulse generator 403 and an inverter 407. The rest of the components of the video tape recorder/player are the same as those of the video tape recorder/player shown in FIG. 1. In this embodiment, a normal video signal and a wide video signal are transmitted with the width $\tau_{HS}$ of their horizontal synchronizing signals fixed.

Figure 7:
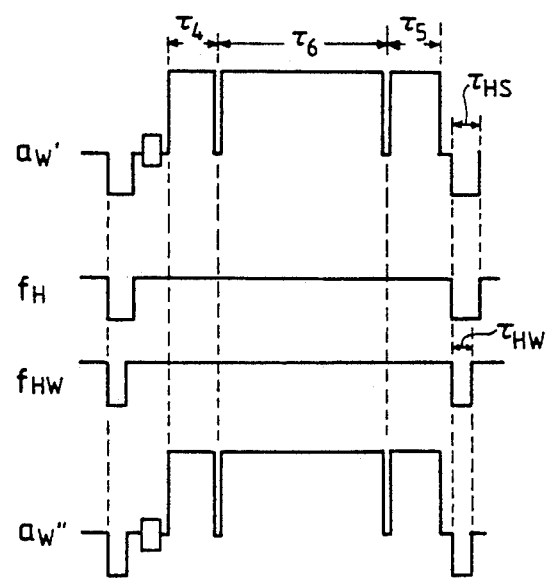
FIG. 7 is a diagram of assistance in explaining the operation of the video tape recorder/player of FIG. 6.

If recorded as transmitted, the normal video signal and the wide video signal cannot be identified. Therefore, the width of the horizontal synchronizing signal of the wide video signal is reduced as shown in FIG. 7 in recording the wide video signal on a magnetic tape. When a wide video signal recording command S is given by the system controller, namely, when the wide video signal recording command S is HIGH, the upper contact of the switch 401 is closed to select a wide video signal $a_W'$, which is a decoded signal having a horizontal synchronizing signal $f_H$ of a width $\tau_{HS}$. The synchronizing separator 402 separates the horizontal synchronizing signal $f_H$ from the wide video signal $a_W'$, the pulse generator 403 generates a pulse $f_{HW}$ of a width $\tau_{HW}$ smaller than the width $\tau_{HS}$, and the horizontal synchronizing signal $f_H$ is replaced with the pulse $f_{HW}$ to provide a signal $a_W''$ through the switch 404 to record the signal $a_W''$ on the magnetic tape. A pilot signal of a low frequency which will not cause disturbance, which is used in the 8 mm video system, may be recorded together with the wide video signal or an ID signal may be recorded during a vertical blanking period.

As stated above, since those two kinds of signals are recorded in various modes, the accessibility of the video tape recorder/player may be improved by indicators respectively for indicating the recording mode, the kind of the signal to be recorded, the reproducing mode and the kind of the reproduced signal.

Sixth Embodiment

In the fifth embodiment, the width of the horizontal synchronizing signal is reduced to provide a wide video signal identification signal (ID information) representing aspect ratio information. In the sixth embodiment, the duty factor of the control signal (CTL) recorded longitudinally along the edge of a magnetic tape for tracking is changed.

Referring to FIG. 11, there are shown revolving heads 507 and 508 mounted on a rotary drum 509 for recording and reproducing video signals, a magnetic tape 20, a drum motor 511, a drum servocircuit 512, a frequency discriminator 515, a divider 516, a phase comparator 517, an adder 518, a drum tach head 519 for detecting the phases of the revolving heads 507 and 508, a changeover switch 401, a record processor 525 for processing the output signal of the changeover switch 401, namely, an input signal V to be recorded, to provide a signal suitable for recording in a magnetic tape 20 (both analog recording and digital recording), a duty converter 526 for changing the duty factor of a control signal REC CTL to be recorded on the magnetic tape according to an aspect ratio signal or a wide video signal recording command S, and a control head 527 for recording and reproducing the control signal REC CTL.

The recording operation of the video tape recorder/player will be described hereinafter with reference to FIGS. 11, 12(A) and 12(B).

When the input signal V to be recorded is a wide video signal, the record processor 525 processes the input signal V so that a signal including all the wide picture information is recorded. During the recording operation, the drum servocircuit 512 controls the drum motor 511 so that the rotary drum 509 is rotated at a given rotational speed (approximately 1798 rpm for the NTSC color TV system). The frequency discriminator 515 functions for speed control so that the frequency of a signal DFG representing the rotational frequency of the drum motor 511 is constant. The phase comparator 517 functions for phase control so that the phase of a signal DTP representing the phase of the rotary drum 509 detected by the drum tach head 519 coincides with the phase of the signal (about 29.97 Hz) obtained by dividing down the frequency of the vertical synchronizing signal Sync (about 59.94 Hz for the NTSC system) included in the input signal V by two by the divider 516. Error signals provided from the frequency discriminator 515 and the phase comparator 517 are applied to the adder 518 to control the drum motor 511.

The signal DTP of about 29.97 is subjected to a predetermined processing and is written along the lower edge of the magnetic tape 20 as a tracking signal REC CTL. The duty factor of the signal REC CTL is changed corresponding to aspect ratio information. That is, the duty factor of the signal DTP is changed by the duty converter 526 according to the aspect ratio signal (wide command) S. FIG. 12(A) shows the waveform of the signal REC CTL for an aspect ratio $a_2$ (normal mode, in which the aspect ratio signal S is HIGH), in which the duty factor is not less than 50% (about 60%). FIG. 12(B) shows the waveform of the signal REC CTL for an aspect ratio $a_1$ (wide mode, in which the aspect ratio signal S is LOW), in which the duty factor is about 50%.

In the state shown in FIG. 11, where the contact of the switch 401 for the wide side is closed and the wide video signal recording command S is LOW, the signal REC CTL having the waveform shown in FIG. 12(B) is recorded on the magnetic tape 20. When the wide video signal recording command S is HIGH and a normal video signal is applied to the terminal 12, the signal REC CTL having the waveform shown in FIG. 12(A) is recorded on the magnetic tape 20.

The reproducing operation will be described hereinafter with reference to FIG. 13.

Figure 13:
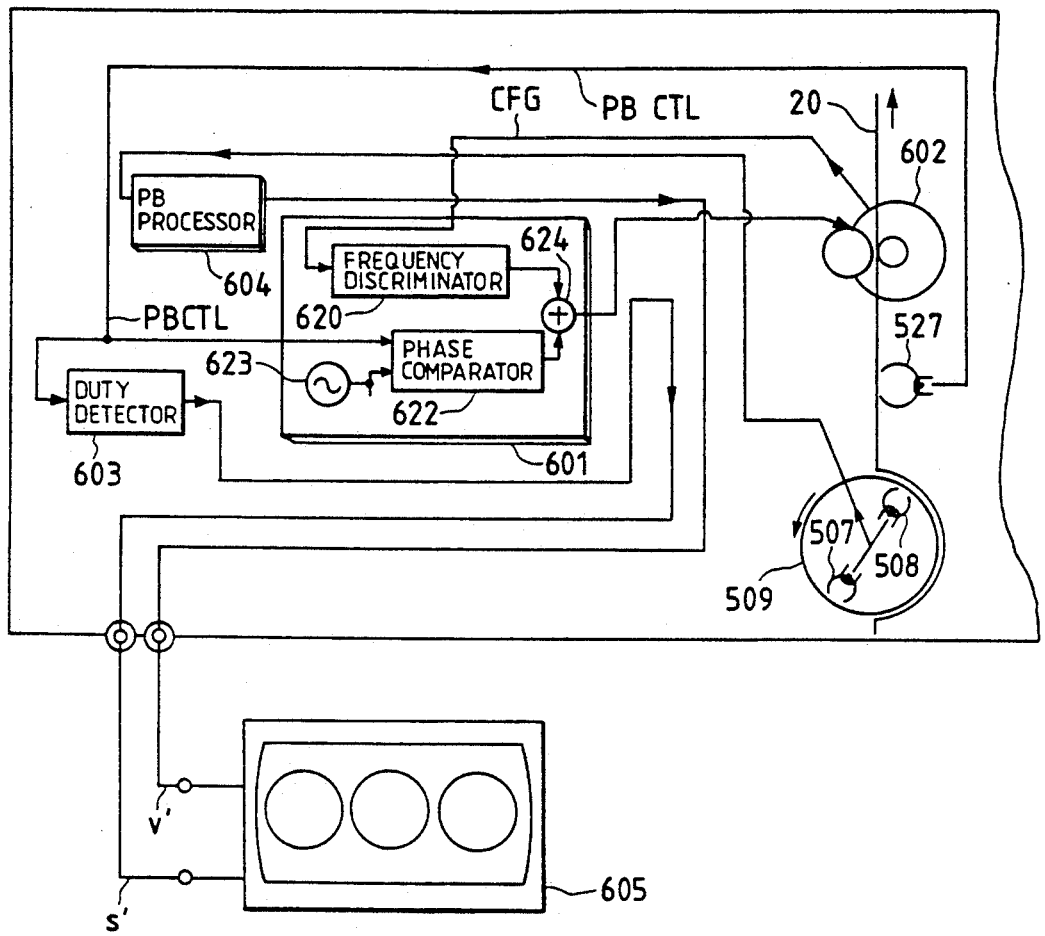

In FIG. 13, indicated at 601 is a capstan servocircuit. During reproduction, a frequency discriminator 620 functions for speed control so that the frequency of a signal CFG representing the detected rotational frequency of a capstan motor 602 is constant to make the capstan motor 602 drive the magnetic tape 20 at a fixed speed. The phase comparator 622 functions for phase control so that the phase of a reproduced control signal PB CTL reproduced by the control head 527 coincides with the phase of a signal of a reference signal generator 623 (about 29.97 Hz). The output signals provided by the revolving heads 507 and 508 are processed by a PB processor 604 to provide a reproduced video signal V'. The reproduced video signal V' is applied to a display 605. The display 605 is capable of properly displaying either a normal video signal or a wide video signal according to the aspect ratio signal S' and is capable of readily dealing with either a normal video signal or a wide video signal by changing over the operating mode of a deflecting system of the display 605 or the like. When the aspect ratio signal S' is LOW, the display 605 functions for displaying a wide video signal.

The reproduced video signal processing mode is dependent on the duty factor of the tracking signal REC CTL recorded on the tape. Therefore, the duty factor of the reproduced control signal PB CTL is identified to decide whether the reproduced video signal is to be processed as a normal video signal or whether the same is to be processed as a wide video signal. The output aspect ratio signal S' of a duty detector 603 is HIGH when the duty factor of the reproduced control signal PB CTL is about 60%, and is LOW when the same is about 50%.

Figure 14A:
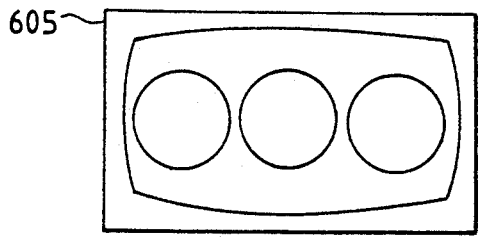
FIGS. 14(A) and 14(B) are illustrations of reproduced pictures.
Figure 14B:
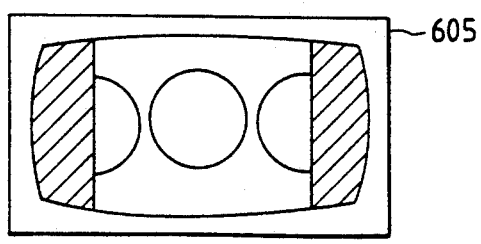

FIGS. 14(A) and 14(B) show pictures displayed on the display 605. The aspect ratio signal S' is LOW for a picture of a wide aspect ratio and a picture of an aspect ratio of 16:9 as shown in FIG. 14(A) is displayed on the display 605. The aspect ratio signal S' is HIGH for a picture of a normal aspect ratio and a picture of an aspect ratio of 4:3 as shown in FIG. 14(B) is displayed on the display 605. In FIG. 14(B), the hatched portions are blank.

In some cases, the duty factor of the control signal CTL is changed to index a particular position on the magnetic tape (VISS, VASS). In such a case, duty factors are assigned to indexing information and aspect ratio information.

As stated above, ID information produced by changing the width of the horizontal synchronizing signal may be recorded, a pilot signal of a low frequency which will not cause disturbance, which is used by the 8 mm video system, may be recorded together with a wide video signal, an ID signal may be recorded during the vertical blanking period of a video signal or aspect ratio information may be recorded in an ID area (user area) on the tape. These identifying means are applicable also to the EDTV system and the HDTV system using a wide-band aspect ratio of 16:9.

Seventh Embodiment

A video tape recorder/player in a seventh embodiment according to the present invention receives a normal video signal or a wide video signal from a video camera. This video tape recorder/player is suitable for producing a video movie by selectively taking pictures in the normal aspect ratio of 4:3 and in the wide aspect ratio of 16:9.

Figure 15:
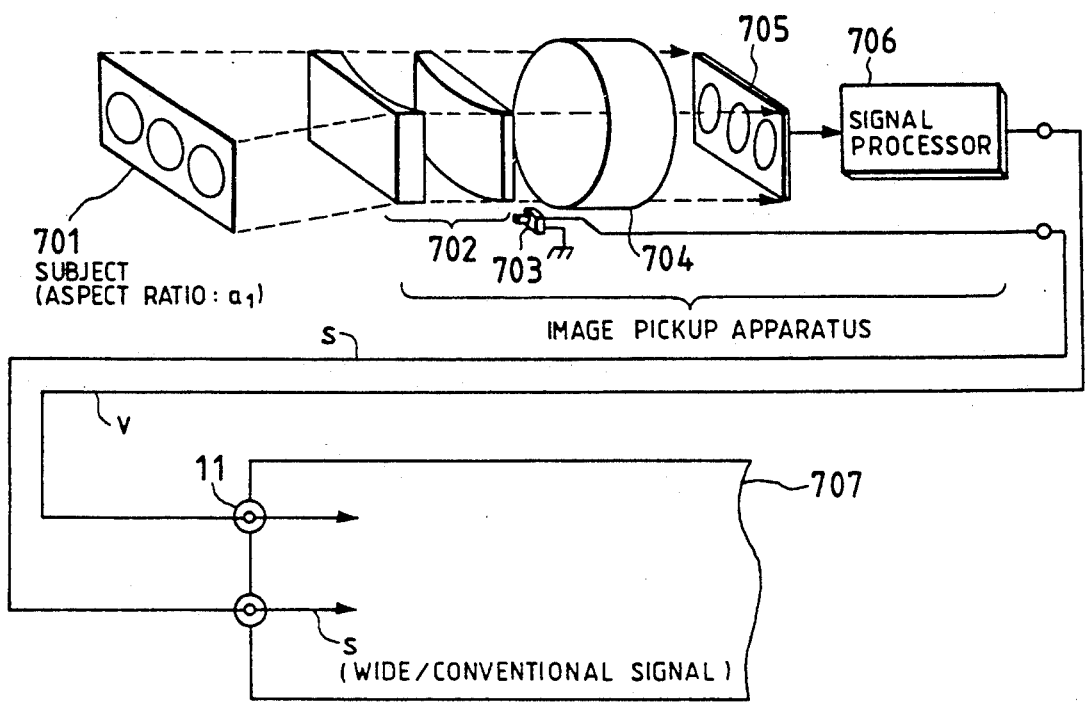

Referring to FIG. 15, there are shown a wide subject 701 of the aspect ratio $a_1$ (16:9) (represented by three circles), an ordinary taking lens 704, an aspect ratio changing lens unit 702, such as an anamorphic optical lens system disclosed in Japanese Patent Laid-open (Kokai) No. 62-52517, disposed in front of the taking lens 704 to change the aspect ratio, an aspect ratio detecting switch 703 which detects the placement of the aspect ratio changing lens unit 702 at the operating position and provides a HIGH detection signal when the aspect ratio changing lens unit 702 is not at the operating position and provides a LOW detection signal when the aspect ratio changing unit 702 is at the operating position, a solid-state image sensor 705, such as a CCD (charge coupled device) having a taking surface of the aspect ratio $a_2$ (4:3), and a camera signal processor 706.

In the state shown in FIG. 15, where the aspect ratio changing lens unit 702 is disposed at the operating position, the aspect ratio signal (wide command) S is LOW (wide mode). A picture of the wide aspect ratio $a_1$ (16:9) is focused in a heightwise expanded state on the solid-state image sensor 705 of the aspect ratio $a_2$ (4:3). The solid-state image sensor 705 provides a video signal V including all the picture information for the aspect ratio $a_1$ (16:9).

The video signal V and the wide video signal recording command S are transferred to and recorded by the video tape recorder/player 707 capable of recording either video signals of the aspect ratio $a_1$ or the video signals of the aspect ratio $a_2$. The video tape recorder/player 707 records both the wide video signal and the aspect ratio information indicating the wide aspect ratio.

When the subject is of the aspect ratio $a_2$ (4:3), the aspect ratio changing lens unit 702 is removed. A normal video signal of the aspect ratio $a_2$ is focused on the taking surface of the aspect ratio $a_2$ of the solid-state image sensor 705. The video signal V processed by the camera signal processor 706 is recorded on a magnetic tape. In this state, the aspect ratio signal (wide video signal recording command) S of the aspect ratio detecting switch 703 is HIGH, and the aspect ratio signal S indicating the normal aspect ratio is recorded on the magnetic tape by the video tape recorder/player 707.

Accordingly, the recorded video signal is reproduced and displayed on the display in the aspect ratio of the recorded video signal.

Although the seventh embodiment has been described as applied to a video system separately having the video camera and the video tape recorder/player, the present invention is applicable to a video system integrally comprising the video camera and the video tape recorder/player and to a video system integrally comprising the video camera, the video tape recorder/player and the display, which is analogous with an EVE.

Eighth Embodiment

A video tape recorder/player in an eighth embodiment according to the present invention is used in combination with a video camera capable of electrically changing the aspect ratio.

Figure 16:
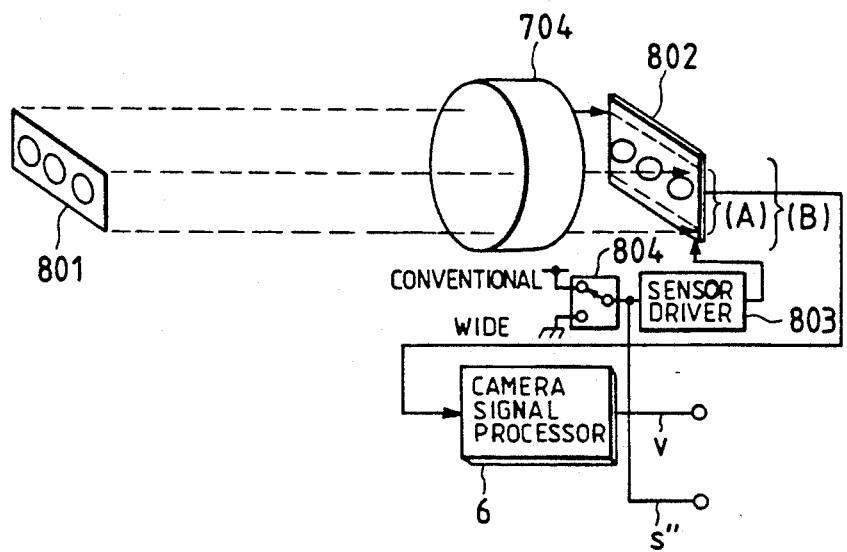

Referring to FIG. 16, the video camera changes the aspect ratio by changing the image scanning mode of a solid-state image sensor 802 instead of using an aspect ratio changing lens unit. The solid-state image sensor 802 is of the PAL system having more picture elements than that of the NTSC system. A sensor driver 803 drives the solid-state image sensor 802 in a wide scanning mode for scanning a portion A (FIG. 16) or in a normal scanning mode for scanning a portion B (FIG. 16). The wide scanning mode or the normal scanning mode is selected by manually operating an aspect ratio selector switch 804. The aspect ratio selector switch provides an aspect ratio information S" representing the selected scanning mode. The operation of the video tape recorder/player is the same as that of the foregoing video tape recorder/players.

What is claimed is:

1. A video tape player comprising:
a reproducing magnetic head for reproducing signals recorded on a recording medium;
a first signal processing circuit for converting the signals reproduced by the reproducing magnetic head into a first video signal for forming a picture of a first aspect ratio on a first display having a display area of the first aspect ratio, wherein the first video signal includes a horizontal synchronizing signal having a predetermined frequency;
a second signal processing circuit for converting the signals reproduced by the reproducing magnetic head into a second video signal for forming a picture of a second aspect ratio on a second display having a display area of the second aspect ratio, wherein the second video signal includes a horizontal synchronizing signal having the predetermined frequency; and
a signal processing mode setting circuit for causing the second signal processing circuit to operate when the reproduced signals are to be converted into the second video signal;
wherein the signal processing mode setting circuit includes a detecting circuit for detecting the type of the reproduced signals and generating a detection signal when the reproduced signals correspond to the second video signal, and a control circuit for causing the second signal processing circuit to operate upon receiving the detection signal from the detecting circuit; and
wherein the detecting circuit detects the pulse width of a horizontal synchronizing signal included in the reproduced signals, and generates the detection signal when the detected pulse width is different from the pulse width of the horizontal synchronizing signal included in the first video signal.

2. A video tape player comprising:
a reproducing magnetic head for reproducing signals recorded on a recording medium;
a first signal processing circuit for converting the signals reproduced by the reproducing magnetic head into a first video signal for forming a picture of a first aspect ratio on a first display having a display area of the first aspect ratio, wherein the first video signal includes a horizontal synchronizing signal having a predetermined frequency;
a second signal processing circuit for converting the signals reproduced by the reproducing magnetic head into a second video signal for forming a picture of a second aspect ratio on a second display having a display area of the second aspect ratio, wherein the second video signal includes a horizontal synchronizing signal having the predetermined frequency; and
a signal processing mode setting circuit for causing the second signal processing circuit to operate when the reproduced signals are to be converted into the second video signal;
wherein the signal processing mode setting circuit includes a detecting circuit for detecting the type of the reproduced signals and generating a detection signal when the reproduced signals correspond to the second video signal, and a control circuit for causing the second signal processing circuit to operate upon receiving the detection signal from the detecting circuit; and
wherein the detecting circuit detects the duty factor of a control pulse included in the reproduced signals, and generates the detection signal when the detected duty factor coincides with a predetermined duty factor indicative of the second video signal.

3. A video tape player according to claim 1 or 2, further comprising an external output terminal through which the detection signal from the detecting circuit is provided to a display.

4. A video tape recorder comprising:
a magnetic recording circuit capable of operating in a first recording mode for recording a first video signal for forming a picture of a first aspect ratio in a first frequency band on a magnetic tape or in a second recording mode for recording the first video signal in a second frequency band wider than the first frequency band on the magnetic tape, wherein the first video signal includes a horizontal synchronizing signal having a predetermined frequency; and a recording mode setting circuit for causing the magnetic recording circuit to operate in the second recording mode for recording a second video signal for forming a picture of a second aspect ratio different from the first aspect ratio on the magnetic tape, wherein the second video signal includes a horizontal synchronizing signal having the predetermined frequency;

wherein the recording mode setting circuit includes a detecting circuit for detecting whether or not a video signal to be recorded includes a signal identifier indicative of the second video signal; and wherein the detecting circuit detects the pulse width of a horizontal synchronizing signal included in a video signal to be recorded.

5. A video tape recorder comprising:

a magnetic recording circuit capable of operating in a first recording mode for recording a first video signal for forming a picture of a first aspect ratio in a first frequency band on a magnetic tape or in a second recording mode for recording the first video signal in a second frequency band wider than the first frequency band on the magnetic tape, wherein the first video signal includes a horizontal synchronizing signal having a predetermined frequency;

a recording mode setting circuit for causing the magnetic recording circuit to operate in the second recording mode for recording a second video signal for forming a picture of a second aspect ratio different from the first aspect ratio on the magnetic tape, wherein the second video signal includes a horizontal synchronizing signal having the predetermined frequency; and an identification signal recording circuit for recording a first identification signal on the magnetic tape when the video signal to be recorded is the first video signal and for recording a second identification signal on the magnetic tape when the video signal to be recorded is the second video signal, together with the video signal to be recorded.

6. A video tape recorder according to claim 5, wherein the identification signal recording circuit changes the pulse width of a horizontal synchronizing signal included in a video signal to be recorded depending upon whether the video signal to be recorded is the first video signal or the second video signal.

7. A video tape recorder according to claim 5, wherein the identification signal recording circuit changes the duty factor of a tracking control pulse to be recorded together with the video signal depending upon whether the video signal to be recorded is the first video signal or the second video signal such that the duty factor of the tracking control pulse for the first video signal and the duty factor of the tracking control pulse for the second video signal are different from each other.

8. A video tape recorder comprising:

a recording circuit capable of operating in a first recording mode for recording a first video signal of a first aspect ratio in a first frequency band on a magnetic tape or in a second recording mode for recording the first video signal in a second frequency band wider than the first frequency band on the magnetic tape, wherein the first video signal includes a horizontal synchronizing signal having a predetermined frequency;

an input terminal for receiving a signal obtained by decoding a second video signal of a second aspect ratio with a wide decoder, wherein the second video signal includes a horizontal synchronizing signal having the predetermined frequency;

a time expansion circuit for expanding the time base of the signal received by the input terminal by a factor corresponding to a ratio of the first and second aspect ratios and supplying the signal having the expanded time base to the recording circuit when the recording circuit is operating in the first recording mode; and an identification signal recording circuit for recording a first identification signal on the magnetic tape together with the first video signal, and for recording a second identification signal on the magnetic tape together with the second video signal.

9. A video tape recorder according to claim 8, wherein the identification signal recording circuit changes the pulse width of a horizontal synchronizing signal included in a video signal to be recorded depending upon whether the video signal to be recorded is the first video signal or the second video signal.

10. A video tape recorder according to claim 8, wherein the identification signal recording circuit changes the duty factor of a tracking control pulse to be recorded together with the video signal depending upon whether the video signal to be recorded is the first video signal or the second video signal such that the duty factor of the tracking control pulse for the first video signal and the duty factor of the tracking control pulse for the second video signal are different from each other.

11. A video tape recorder comprising:

a recording circuit capable of operating in a first recording mode for recording a first video signal of a first aspect ratio in a first frequency band on a magnetic tape or in a second recording mode for recording the first video signal in a second frequency band wider than the first frequency band on the magnetic tape, wherein the first video signal includes a horizontal synchronizing signal having a predetermined frequency;

a wide decoding circuit for decoding a second video signal of a second aspect ratio to produce a decoded signal, wherein the second video signal includes a horizontal synchronizing signal having the predetermined frequency;

a time expansion circuit for expanding the time base of the decoded second video signal from the decoding circuit by a factor corresponding to a ratio of the first and second aspect ratios;

a signal transmission control circuit for transmitting either the second video signal before decoding by the wide decoding circuit or an output signal of the time expansion circuit to the recording circuit when the recording circuit is operating in the first recording mode, and for transmitting the decoded second video signal from the wide decoding circuit to the recording circuit when the recording circuit is operating in the second recording mode; and an identification signal recording circuit for recording a first identification signal on the magnetic tape together with the first video signal, and for recording a second identification signal on the magnetic tape together with the second video signal.

12. A video tape recorder according to claim 11, wherein the identification signal recording circuit changes the pulse width of a horizontal synchronizing signal included in a video signal depending upon whether the video signal to be recorded is the first video signal or the second video signal.

13. A video tape recorder according to claim 11, wherein the identification signal recording circuit changes the duty factor of a tracking control pulse to be recorded together with the video signal depending upon whether the video signal to be recorded is the first video signal or the second video signal such that the duty factor of the tracking control pulse for the first video signal and the duty factor of the tracking control pulse for the second video signal are different from each other.

14. A video tape recorder comprising:

a recording circuit for recording a first video signal of a first aspect ratio on a magnetic tape, wherein the first video signal includes a horizontal synchronizing signal having a predetermined frequency;

an input terminal for receiving the first video signal and a second video signal of a second aspect ratio different from the first aspect ratio, wherein the second video signal includes a horizontal synchronizing signal having the predetermined frequency;

a time expansion circuit for expanding the time base of a video signal received by the input terminal by a factor corresponding to a ratio of the first and second aspect ratios;

a signal transmission control circuit for transmitting an output signal of the time expansion circuit to the recording circuit when the input terminal receives the second video signal after the second video signal is decoded by a wide decoder, and for transmitting a video signal received by the input terminal to the recording circuit bypassing the time expansion circuit when the video signal received by the input terminal is the first video signal or the second video signal when the second video signal is not decoded by the wide decoder; and an identification signal recording circuit for recording a first identification signal on the magnetic tape when a video signal to be recorded is the first video signal and for recording a second identification signal on the magnetic tape when the video signal to be recorded is the second video signal, together with the video signal to be recorded.

15. A video tape recorder comprising:

a video signal recording circuit for recording a first video signal of a first aspect ratio and a second video signal of a second aspect ratio different from the first aspect ratio on a magnetic tape, wherein the first video signal includes a horizontal synchronizing signal having a predetermined frequency and the second video signal includes a horizontal synchronizing symbol having the predetermined frequency; and a control signal recording circuit for recording a tracking control pulse on the magnetic tape together with the first and second video; signals, wherein the duty factor of the tracking control pulse to be recorded together with the first video signal and the duty factor of the tracking control pulse to be recorded together with the second video signal are different from each other.

16. A video tape recorder/player comprising:

means for receiving a normal video signal including a horizontal synchronizing signal having a predetermined frequency, and receiving a wide video signal including a horizontal synchronizing signal having the predetermined frequency;

first recording signal processing means for processing the normal video signal received by the receiving means to produce a normal video recording signal;

second recording signal processing means for processing the wide video signal received by the receiving means to produce a wide video recording signal;

a video head for recording the normal video recording signal on a magnetic tape at a predetermined recording speed in a recording mode, recording the wide video recording signal on the magnetic tape at the predetermined recording speed in the recording mode, and reproducing the recorded normal video recording signal and the recorded wide video recording signal from the magnetic tape in a playback mode;

means for generating a control signal having a first duty factor when the receiving means receives the normal video signal and having a second duty factor different from the first duty factor when the receiving means receives the wide video signal;

a control head for recording the control signal on the magnetic tape in the recording mode and reproducing the recorded control signal from the magnetic tape in the playback mode;

first playback signal processing means for processing the reproduced normal video signal to produce a normal video output signal;

second playback signal processing means for processing the reproduced wide video signal to produce a wide video output signal;

detecting means for detecting a duty factor of the reproduced control signal and outputting a detection signal indicating whether the detected duty factor is the first duty factor or the second duty factor; and selecting means responsive to the detection signal for receiving the normal video output signal and the wide video output signal, outputting the normal video output signal if the detection signal indicates that the detected duty factor is the first duty factor, and outputting the wide video output signal if the detection signal indicates that the detected duty factor is the second duty factor.

* * * * *

UNITED STATES PATENT AND TRADEMARK OFFICE
CERTIFICATE OF CORRECTION

PATENT NO. : 5,307,171
DATED : April 26, 1994
INVENTOR(S) : Azuma et al.

It is certified that error appears in the above-identified patent and that said Letters Patent is hereby corrected as shown below:

On the title page, in item [54], delete "VIDEO TAPE RECORDER/PLAYER" insert --VIDEO TAPE RECORDER/PLAYER FOR RECORDING/REPRODUCING VIDEO SIGNALS HAVING DIFFERENT ASPECT RATIOS--.

On the title page, delete item [73] in its entirety and insert the following new item [73]:
--[73] Assignees: Hitachi, Ltd., Tokyo; Hitachi Video Engineering, Inc., Yokohama, both of Japan--

Column 1, line 2, delete "VIDEO TAPE RECORDER/PLAYER" insert --VIDEO TAPE RECORDER/PLAYER FOR RECORDING/REPRODUCING VIDEO SIGNALS HAVING DIFFERENT ASPECT RATIOS--.

Claim 15, line 9, delete "symbol" insert --signal--; line 13, delete ";".

Signed and Sealed this

Seventh Day of December, 1999

*Attest:*

Q. TODD DICKINSON

*Attesting Officer*  Acting Commissioner of Patents and Trademarks